United States Patent [19]

Goodman

[11] Patent Number: 5,586,889
[45] Date of Patent: Dec. 24, 1996

[54] HAND HELD TEACH AND TEST DEVICE

[76] Inventor: Milton Goodman, 160-06 65TH Ave., Flushing, N.Y. 11365

[21] Appl. No.: 310,889

[22] Filed: Sep. 22, 1994

[51] Int. Cl.⁶ .................................................. G09B 3/00
[52] U.S. Cl. .......................... 434/327; 434/308; 434/322; 434/323; 434/335
[58] Field of Search .................................... 434/308, 322, 434/323, 327, 335, 336, 353

[56] References Cited

U.S. PATENT DOCUMENTS

| | | |
|---|---|---|
| 3,696,524 | 10/1972 | Kranyik et al. . |
| 4,690,645 | 9/1987 | Ukisu . |
| 4,884,974 | 12/1989 | Desmet . |
| 4,990,093 | 2/1991 | Frazer et al. . |
| 5,035,625 | 7/1991 | Munson et al. ...................... 434/327 X |
| 5,161,977 | 10/1992 | Thomas, Jr. . |
| 5,178,545 | 1/1993 | Thompson ............................... 434/335 |
| 5,204,813 | 4/1993 | Samph et al. ........................ 434/323 X |
| 5,211,564 | 5/1993 | Martinez .................................. 434/323 |
| 5,213,337 | 5/1993 | Sherman ............................. 434/323 X |
| 5,314,340 | 5/1994 | Gaddis . |

Primary Examiner—Richard J. Apley
Assistant Examiner—Glenn E. Richman
Attorney, Agent, or Firm—Collard & Roe, P.C.

[57] ABSTRACT

A device for recording individual answers to a set of questions selected from several sets of questions with each set having an identification code. The device includes a selector for entering an identification code to select one of the sets of questions. An indicator serially prompts for an answer to each question within the set. Response buttons are provided for entering an answer to each question. The number of correct and incorrect answers is recorded and can be downloaded into a computer for instant grading and archiving.

18 Claims, 6 Drawing Sheets

FIG. 1B ← 51

ADDITION AND SUBTRACTION

TEST NO: A - 72

B - 49

C - 12

1. 10 - 6 =

A. 1
   B. 2
   C. 3
   D. 4

2. 8 + 3 =

A. 10
   B. 11
   C. 12
   D. 13

3.
   .
   .
   .
   .
   .
10.

11. 20 - 6 =

A. 10
    B. 12
    C. 14
    D. 16

12. 12 + 7 =

A. 15
    B. 19
    C. 23
    D. 21

13.
    .
    .
    .
    .
    .
20.

HAND HELD TEACH AND TEST DEVICE

BACKGROUND OF THE INVENTION

1. Field of the Invention

The present invention relates to a hand held teach and test device. More specifically, it relates to a portable device that can be operated in either a teach mode or a test mode. In a teach mode, the user is provided with several opportunities to answer a question until they select the right answer. The device visually displays any incorrect answer that may have been initially provided so that those answers will not be selected again. In a test mode, the user is provided with one opportunity to answer each question. In either mode, a prominent visual display is activated upon selection of the correct answer to provide positive reinforcement for the user.

2. Prior Art

A variety of educational devices are known for providing electronic, audio and/or visual means for educating and testing individuals. An example of some of these prior art devices can be found in the following U.S. Pat. Nos. 4,990,093 to Frazer et al, 3,696,524 to Kranyik et al, 4,884,974 to DeSmet, 4,690,645 to Ukisu, 5,161,977 to Thomas, Jr., and 5,314,340 to Gaddis. A number of limitations exist with regard to each of the prior art devices. Many of the prior art devices are not able to record incorrect answers provided by a user, which information can be useful in directing further instruction. Many of the devices are also limited by the type and extent of sources or questions that can be used with the device.

Therefore, it would be desirable to provide a hand-held teach and test device for which the questions can be in any format, which records useful information to assist in future instruction and which provides instant grading of standardized tests.

SUMMARY OF THE INVENTION

It is therefore an object of the present invention to overcome the drawbacks of the prior art and to provide a hand held device that can be selectively operated in a teach mode or a test mode.

It is a further object of the present invention to provide a hand held teach and test device that records incorrect answers.

It is a further object of the present invention to provide a hand held teach and test device where standardized test answers can be instantly downloaded, graded and archived.

These and other related objects are achieved according to the invention by a device for recording individual answers to a set of questions selected from a plurality of sets. Each set of questions has a separate and unique identification code. The device includes selector means for entering one of the identification codes to select one of the sets of questions. An indicator serially prompts the user for an answer to each of the questions within the set. The user enters answers for each question via response means. Recording means records the number of correct and incorrect answers given. In a teach mode, the indicator repeatedly prompts for an answer to each of the questions until a correct answer is provided. The recording means records the number of incorrect answers given for each question.

A first visual display means is activated to indicated that one incorrect answer has been given. A second visual display means is activated to indicate that two incorrect answers have been given, with the first visual display mean being deactivated. Both the first and second visual display means are activated to indicate that three incorrect answers have been given. A third visual display means indicates which incorrect answers have been given to avoid having that same incorrect answer repeated. A fourth visual display means is activated to indicate that a correct answer has been given. The fourth visual display means is more prominent than the first, second and third visual display means so that positive reinforcement is provided for correct answers.

In the test mode, the indicator prompts for a single answer only to each question. The recording means records the total number of correct answers for each set of questions. The recorded information is downloaded from the device to a separate computer for instant grading and archiving of the answers.

A two position switch is used for selecting between the teach mode and the test mode. The device is a portable, rechargeable, battery-powered unit. The first, second and fourth visual display means comprise a plurality of LEDs, the selector means and the response means comprise a single set of dual-function, depressible keys. The third visual display means comprises a set of LEDs corresponding to the set of keys.

BRIEF DESCRIPTION OF THE DRAWINGS

Other objects and features of the present invention will become apparent from the following detailed description considered in connection with the accompanying drawings which disclose a single embodiment of the present invention. It should be understood, however, that the drawings are designed for the purpose of illustration only and not as a definition of the limits of the invention.

In the drawings, wherein similar reference characters denote similar elements throughout the several views:

FIG. 1B is a top plan view of an embodiment of a sheet of test questions for use with the device;

DETAILED DESCRIPTION OF PREFERRED EMBODIMENTS

Figure 1A:
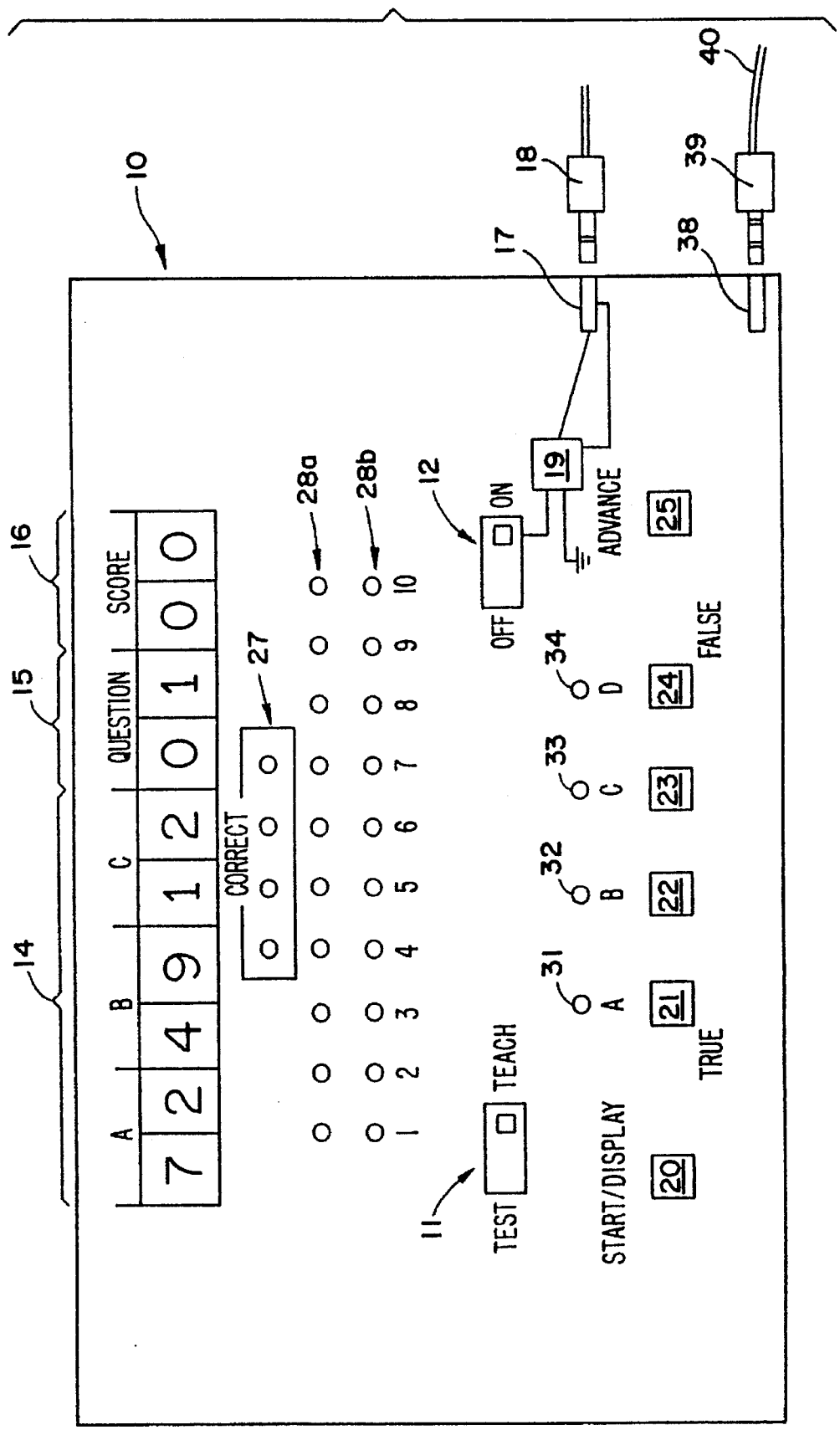
FIG. 1A is a top plan view of an embodiment of the hand held teach and test device according to the invention.

Referring now in detail to the drawings and, in particular, FIG. 1A, there is shown a teach and test device 10 which is a portable battery powered device. The device includes a teach/test selector 11 which allows the user to switch between the test mode and the teach mode. A power switch 12 allows the user to switch the power from a rechargeable battery 19 on and off. Rechargeable battery 19 is coupled to a connector 17 which receives an AC adapter plug 18 for recharging battery 19 from an external power source. When power switch 12 is turned on, displays 14, 15 and 16 are activated. These displays are LED or LCD displays, for example. Below displays 14, 15 and 16, several rows of LED 27, 28A, 28B, 31, 32, 33 and 34 are shown. Along the bottom of device 10 are several buttons 20, 21, 22, 23, 24 and 25. In the lower right hand corner is a further female jack 38 for coupling to a male plug 39. Information stored within device 10 can be downloaded through plug 39 and cable 40 to a separate computer for grading and archiving.

The device operates in a teach mode as follows. First, teach/test selector 11 is pushed to the right into the teach mode. Power switch 12 is also moved to the right into the on position to connect battery 19 to the various electronic circuits contained within the device. The user must then enter a six digit test code, for example, which will be shown in test code display 14. The six digit display 14 consists of a two digit display for category "A", a two digit display for category "B", and a third two digit display for category "C". The "A" button 21, the "B" button 22, and the "C" button 23, are each repeatedly depressed to select the three respective two digit codes appearing in test code display 14. In this particular embodiment, each two digit part of the test code display can contain any number between 00 and 99 for 100 possibilities. Test code displays "B" and "C" can also each display 100 possibilities. In other words, the six digit test code display can show any value between 000,000 and 999,999 for one million possible test codes. Each test code accesses a set of answers stored internally, for example, in ROM.

Once the test code is selected, the start display button 20 is depressed and question display 15 displays question 01. Advance button 25 can be depressed to advance question display 15 by increments of 10 to begin alternatively with question 11, 21, 31, through 91. Each test code has ten sets of ten questions which provide a total of 10 million sets of ten questions.

Figure 2A:
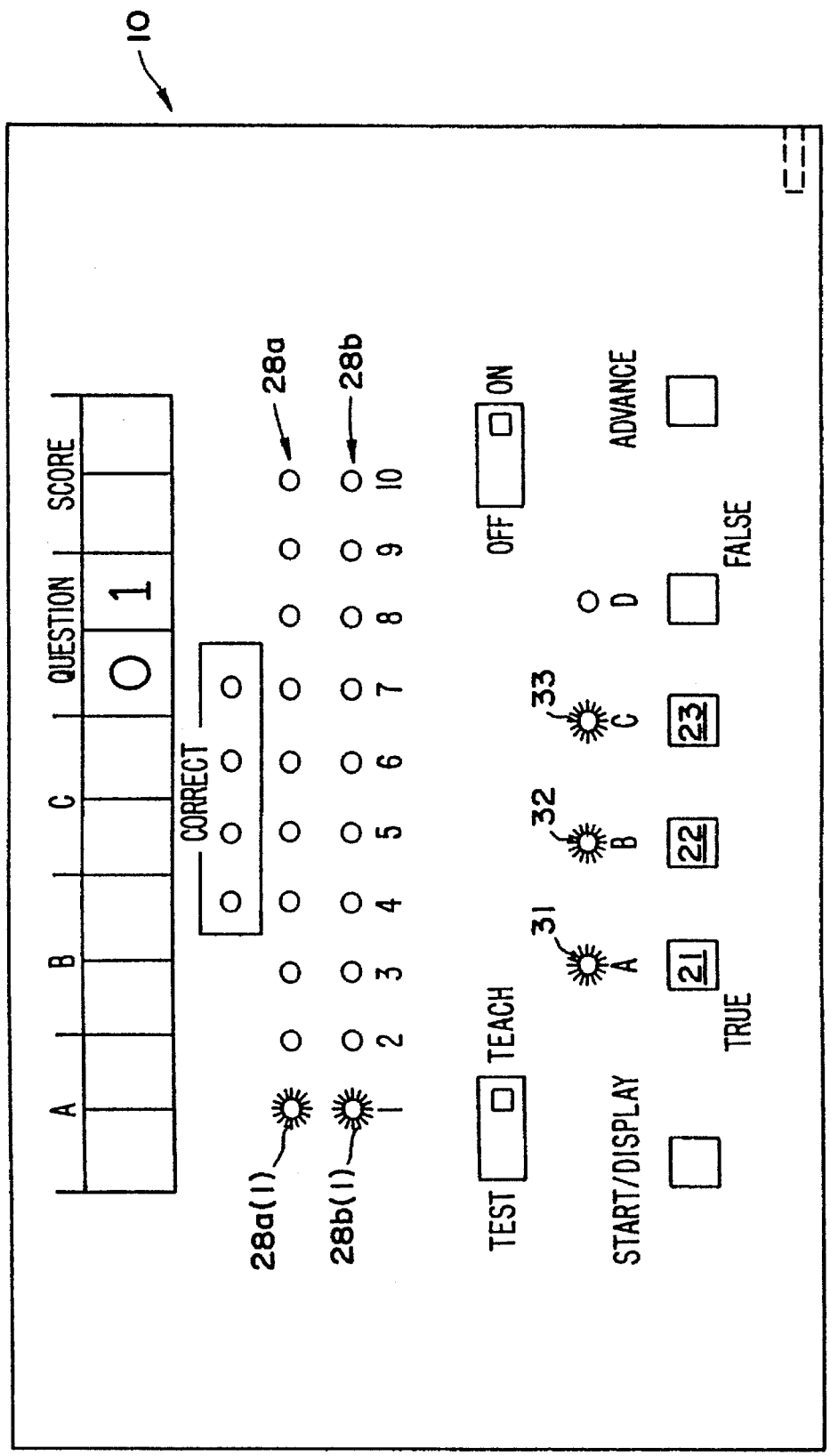
FIGS. 2A and 2B are top plan views of the device operating in the teach mode.
Figure 2B:
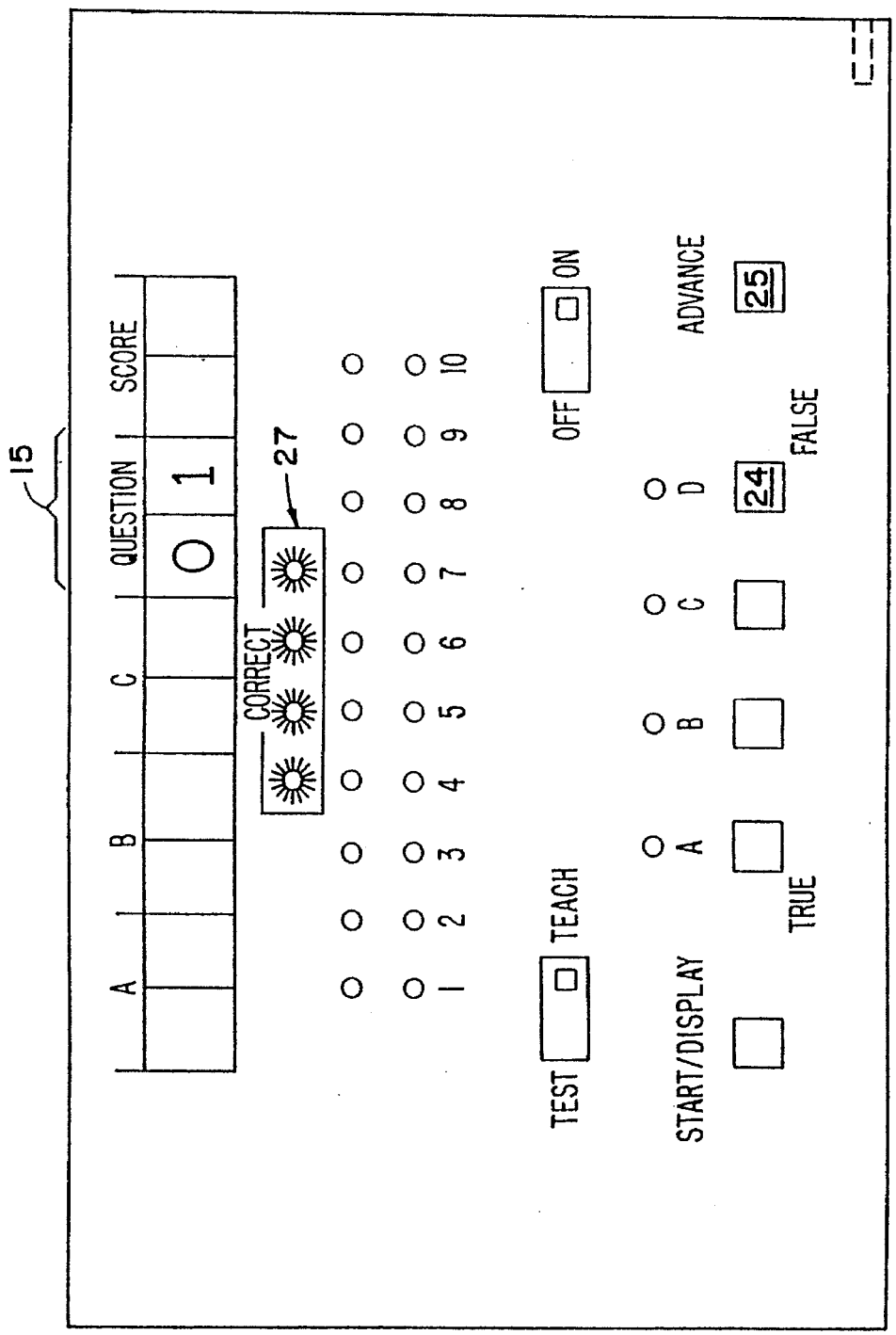

Assuming that questions 1–10 are selected, the device operates as follows. FIG. 1B is a sample of a separate question sheet 51 having certain mathematical questions printed thereon. The upper right hand corner of question sheet 51 shows that this question sheet has test code A72, B49 and C12 which was previously entered into device 10 and is displayed on test code display 14. Referring now to FIG. 2A, there is shown the response of device 10 to the selection of incorrect answers A, B and C for question 1. First, the "A" button 21 is depressed following which a first mistake LED 28A1 is illuminated indicating that one incorrect answer has been provided and the "A" LED 31 is illuminated indicating that A has already been selected and it is incorrect. Next, the "B" button 22 is depressed and first mistake LED 28A1 goes out and second mistake LED 28B1 is illuminated and the "B" LED 32 is illuminated. Second mistake LED 28B1 indicates two mistakes have been made and LEDs 31 and 32 are illuminated showing that A and B have been selected and they are incorrect. Next, the "C" button 23 is depressed and first mistake LED 28A1 is illuminated and the "C" LED 33 is illuminated. When the first and second mistake LEDs 28A1 and 28B1 are both lit, this indicates three mistakes have been made. The illuminated LEDs 31, 32 and 33 indicate that these three answers have been selected and they are all wrong.

When the user depresses the "D" button 24, all of the correct LEDs 27 are illuminated to provide immediate positive reinforcement of the user selecting the correct answer. After the correct answer is selected question display 15 then increments to question 2. The user then refers back to question sheet 51 and selects A, B, C or D as an answer for question 2. If incorrect answers are chosen, the mistake LEDs 28A or 28B are lit to indicate one, two or three mistakes have been made. In addition, the LEDs 31, 32, 33 and 34, corresponding with the mistake in choice, remain lit so that the same incorrect answer is not repeated. Once the correct answer is selected, the correct LEDs 27 immediately light up and the question LED 15 increments to the next question. The configuration shown is for use with multiple choice questions having four options. Alternatively, buttons 21 and 24 may be utilized for true/false type questions. Although four answer options are shown for each question, the device may also be constructed with fewer or greater answer options. The device is not limited as to the types of questions that it can be used with. Since only the answers are stored, the questions could range from simple to complex and be written in any language. The person creating the test would have a key showing all the test codes and the respective answers stored under that test code. A test code is selected and then the questions are formulated so that the answers correspond with the stored answers.

In the test mode, the device operates as follows. The teach/test selector 11 is moved to the left to select the test mode. Power switch 12 is moved to the right to the on position. The "A" button 21, the "B" button 22, and the "C" button 23 are pressed to select a test code which is shown on test code display 14. The start/display button 20 is pressed and question display 15 begins at question 1. If a different set of questions within that test code are desired, then the advance button 25 can be pressed to jump to question 11, 21, 31, etc.

Assuming that questions 1 through 10 are desired, the buttons 21 through 24 are depressed to select an answer to question 1. After a single answer has been provided to question 1, question display 15 will then increment to question 2. The individual will have only a single opportunity to answer each question. In the test mode, LED's 28a, 28b, 31, 32, 33 and 34 are not used. The device will keep track of the number of correct answers provided in score display 16. At the end of the test, the answers and the score could be downloaded through mail plug 39 for instant grading and archiving of the test results.

Figure 3A:
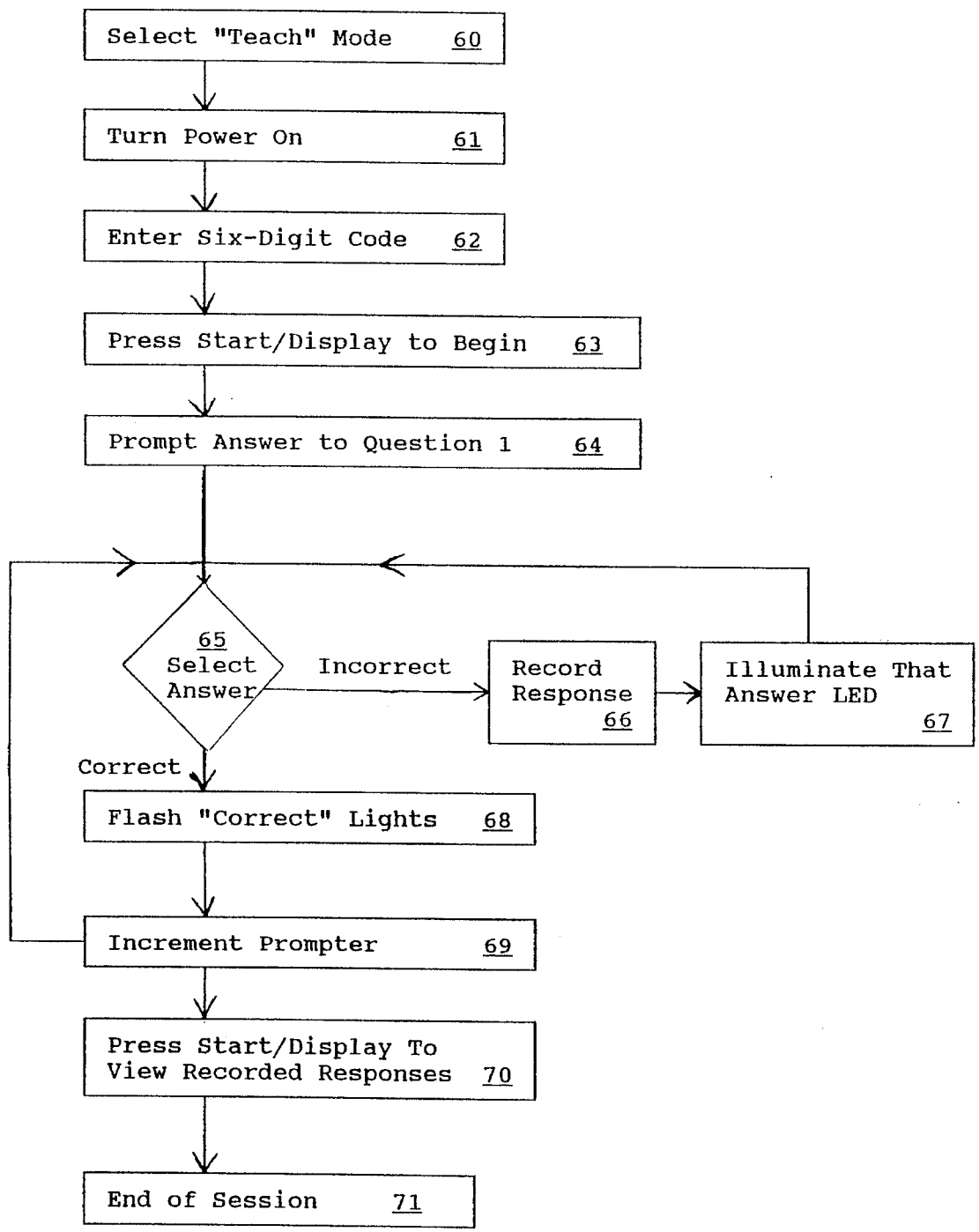
FIG. 3A is a flow chart showing operation of the device in the teach mode.

FIG. 3A is a flow chart showing operation of the device when the teach mode is selected in step 60. The power is turned on in step 61 and the six digit code is entered in step 62. The start/display button is pressed in step 63 and the device prompts for an answer to question 1 in step 64. An answer is selected in step 65 and if the answer is incorrect, the response is recorded in step 66 and the LED corresponding to that incorrect answer is illuminated in step 67. An additional answer is selected in step 65 and the loop, including steps 65, 66 and 67 repeats until a correct answer has been selected. At that point the "correct" lights are illuminated in step 68 and the prompter is incremented in step 69. An answer to the new question is then selected in step 65. At step 65 the flow chart continues to step 66 or 68 as described above. At the end of the test, the start/display button is pressed to view the recorded responses in step 70 or the recorded information can be downloaded. The session ends in step 71.

Figure 3B:
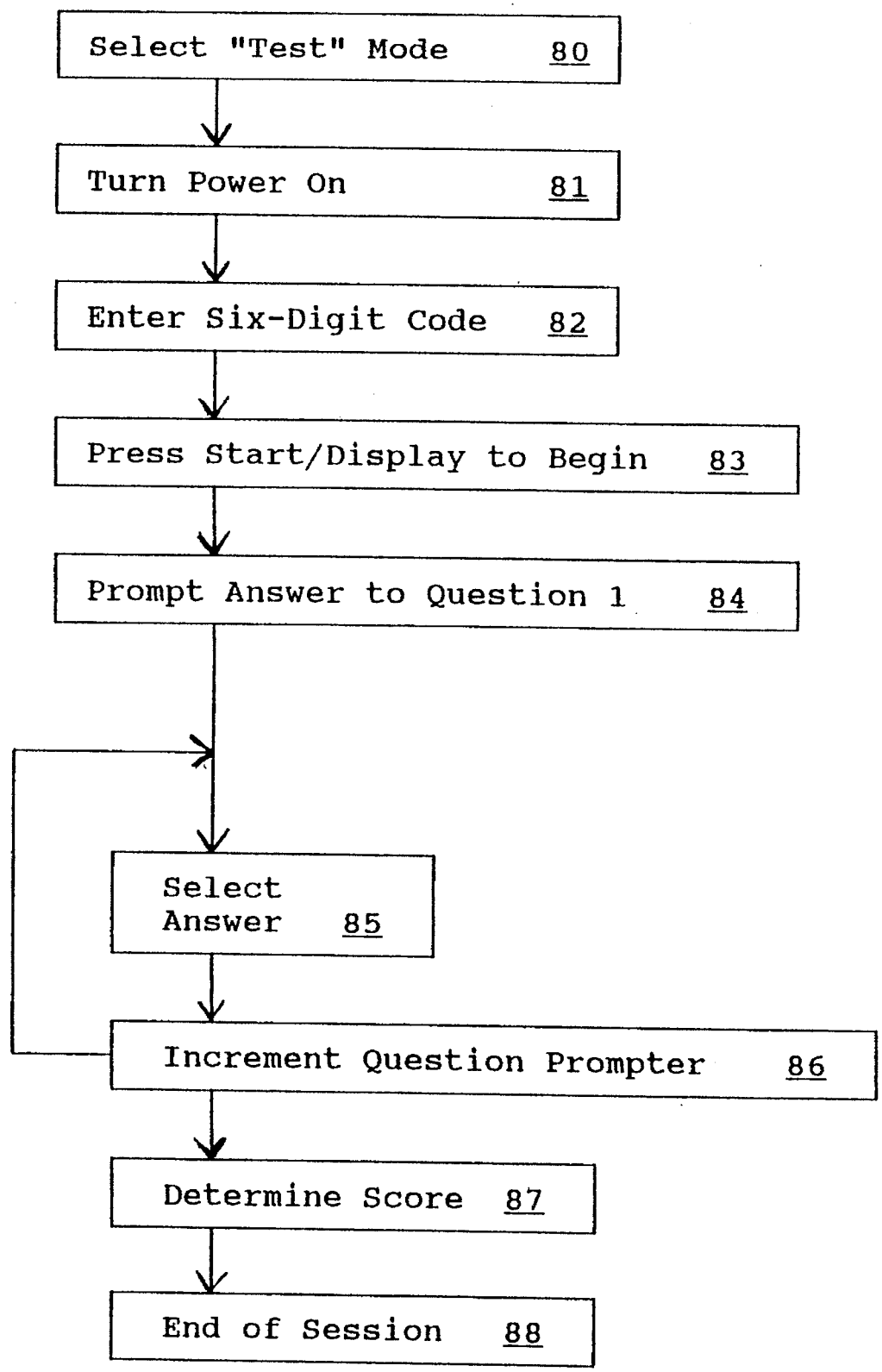
FIG. 3B is a flow chart showing operation of the device in the test mode.

FIG. 3B is a flow chart showing the various steps when the "test" mode is selected in step 80. The power is turned on in step 81 and the six digit code is entered in step 82. The start/display button is pressed to begin in step 83 and the unit prompts for an answer to question 1 in step 84. A single answer is selected in step 85 and the question prompter is incremented in step 86. Steps 85 and 86 are repeated until the end of the test. The score is determined in step 87 which may include downloading the information for instant grading and archiving. The session ends in step 88.

Since the test codes and the corresponding answers are known ahead of time, the device according to the invention has many different applications since the individual in possession of the device can program in the test code themselves. Instead of using a question sheet 51, the questions could be broadcast on TV, recorded onto videotape or printed in newspapers or magazines. The videotape or television format could include a brief educational segment followed by a quiz. Other questions could be public in newspapers or magazines for entertainment or educational purposes. The device has broad applications for training and educating large numbers of people. For standardized tests, each test-taker can be given a different code with questions in different order. This would eliminate concerns over test-takers sharing answers. The test results can be instantly downloaded and graded on the spot, eliminating the need to mail the results weeks later.

While a single embodiment of the present invention has been shown and described, it is to be understood that many changes and modifications may be made thereunto without departing from the spirit and scope of the invention as defined in the appended claims.

What is claimed is:

1. A hand-held device for selecting one of a plurality of sets of internally-stored answers and recording individual responses for comparison to the selected set of answers, each set of answers having an identification code, a plurality of separate sets of questions being freely creatable for each set of answers, the device comprising: select one of said plurality of sets of internally-stored answers;

an indicator for serially prompting for individual responses to a separate set of questions corresponding to the selected set of answers;

response means for registering a response for each question; and recording means for comparing the responses to the answers and recording the number of correct and incorrect responses given.

2. The device according to claim 1, wherein the device includes a teach mode, within said teach mode:

(i) said indicator repeatedly prompts for a response to each of the questions until a correct response is provided via said response means; and (ii) said recording means records the number of incorrect responses given for each question.

3. The device according to claim 2, wherein within said teach mode said recording means comprises visual display means for indicating the number of incorrect responses given.

4. The device according to claim 2, wherein within said teach mode said recording means comprises:

a first visual display means activated to indicate that one incorrect response has been given;

a second visual display means activated to indicate that two incorrect responses have been given, with said first visual display means deactivated; and wherein both said first and second visual display means are activated to indicate that three incorrect responses have been given.

5. The device according to claim 4, comprising third visual display means, wherein within said teach mode said third visual display means indicates which incorrect response has been given to avoid having that same incorrect response repeated.

6. The device according to claim 5, comprising:

fourth visual display means activated to indicate that a correct response has been given, said fourth visual display means is more prominent than said first, second and third visual display means so that positive reinforcement is provided for correct responses.

7. The device according to claim 6, wherein the device includes a test mode, within said test mode (i) said indicator prompts for a single response only to each question; and (ii) said recording means records the total number of correct responses for each set of questions.

8. The device according to claim 7, said recording means comprises:

means for downloading the recorded information from the device to a computer for instant grading within said test mode and archiving of the responses.

9. The device according to claim 8, comprising a two position switch for selecting one of the teach mode and the test mode.

10. The device according to claim 9, wherein the device is a portable, rechargeable-battery powered unit.

11. The device according to claim 10, wherein said first, second and fourth visual display means comprise a plurality of LEDs.

12. The device according to claim 11, wherein said selector means and said response means comprise a single set of dual-function, depressible keys.

13. The device according to claim 12, wherein said third visual display means comprises a set of LEDs corresponding to said set of keys.

14. A hand-held device for selecting one of a plurality of sets of answers and recording individual responses for comparison to the selected answers, each set of answers having an identification code, a plurality of separate sets of questions being freely creatable for each set of answers, the device comprising:

selector means for entering an identification code to select one of said plurality of sets of answers;

an indicator for serially prompting for individual responses to a separate set of questions corresponding to the selected set of answers;

response means for registering a response for each question;

recording means for comparing the responses to the answers and recording the number of correct and incorrect responses given, said recording means including first and second visual display means;

within said teach mode;

(i) said indicator continually and repeatedly prompts for a response to each of the questions until a correct response is provided; and (ii) said first visual display means indicates which incorrect responses have been given to teach which answer is correct;

within said test mode;

(i) said indicator prompts for a single response only to each question;

(ii) said recording means records the total number of correct responses for each set of questions;

within said teach mode and said test mode, said second visual display means being activated to indicate that a correct response has been given, said second visual display means being more prominent than said first visual display means so that positive reinforcement is provided for correct responses.

15. The device according to claim 14, wherein said first, second and fourth visual display means comprise a plurality of LEDs.

16. The device according to claim 15, wherein said selector means and said response means comprise a single set of dual-function, depressible keys.

17. The device according to claim 16, wherein said third visual display means comprises a set of LEDs corresponding to said set of keys.

18. The device according to claim 17, said recording means comprises:

means for downloading the recorded information from the device to a computer for instant grading within said test mode and archiving of the responses.

* * * * *